United States Patent [19]

Muller

[11] Patent Number: 4,932,105
[45] Date of Patent: Jun. 12, 1990

[54] SELF LOCKING ATTACHING SYSTEM

[75] Inventor: John Muller, Englewood, Tenn.

[73] Assignee: Davidson Textron Inc., Dover, N.H.

[21] Appl. No.: 205,368

[22] Filed: Jun. 10, 1988

[51] Int. Cl.$^5$ .............................................. A44B 17/00
[52] U.S. Cl. ...................................... 24/666; 24/297; 24/701
[58] Field of Search ........................ 296/153; 297/412; 248/118, 222.4, 223.1; 24/701, 666, 297, 289, 453; 52/716, 717.1

[56] References Cited

U.S. PATENT DOCUMENTS

| 605,510 | 6/1898 | Patchett | 248/223.1 X |
| 1,937,301 | 11/1933 | Trautvetter | 296/153 X |
| 3,213,506 | 10/1965 | Fernberg | 24/289 |
| 3,455,528 | 7/1969 | Meyer | 248/223 X |

FOREIGN PATENT DOCUMENTS 2729 of 1906 United Kingdom ............ 248/222.4

Primary Examiner—James R. Brittain
Attorney, Agent, or Firm—John C. Evans

[57] ABSTRACT

A fastener system for connecting first and second parts together includes a female fastener having a retention slot therein with an entrance portion, a stop portion and a fastener gripping segment located intermediate said entrance portion and said stop portion; a male fastener has an integral extension thereon insertable into said entrance portion and movable laterally of the slot to an interlocked position at the stop portion. The male fastener includes first surface means thereon engageable with the gripping segment for holding the male fastener in a stop position, and said male fastener further includes second surface means thereon to interlockingly connect the female fastener to the male fastener. The component parts of the fastener system are configured to be formed by use of die members separable in a straight draw.

7 Claims, 2 Drawing Sheets

SELF LOCKING ATTACHING SYSTEM

This invention relates to fastener systems and more particularly to fastener systems having two parts that are interlockingly engageable with each other and suitable for attaching vehicle trim components to panel components of a vehicle without use of screws, spin nuts, glue or barb head type fastener elements.

Various proposals have been tested for connecting vehicle trim parts to panel portions of a vehicle.

One example is set forth in U.S. Pat. No. 3,115,225 which discloses a system for connecting a molding strip to a support panel of a vehicle. The fastener includes a stud having step portions thereon that interlock on the panel by a snap fit. The fastener includes a head fit in an offset hole of a plate member to compensate for manufacturing tolerance differences. The fastener surface configuration requires use of lifters or slides in the mold tooling.

Other fasteners are disclosed in U.S. Pat. Nos. 3,670,082 and 3,435,491. The arrangements provide for interlocking connection between first and second parts. They do not disclose easily manufactured fastener parts having a male component which can be molded without use of lifters or slides. Further, they do not disclose a male fastener and female fastener which join parts and prevent separation of the parts by use of a retention slot having combined stop surface reference and gripping surfaces.

Accordingly, an object of the present invention is to provide a low cost, easily manufactured fastener system having male and female fasteners which are configured to permit insertion and interlocking of the parts by steps which include a piloting and stop referencing function and wherein the interlocked parts include means for positively gripping the male fastener against separation once in interlocked relationship for holding a trim part on a vehicle panel.

A still further object of the present invention is to provide an improved fastener system for connecting interior trim products to a vehicle panel component by the provision of a female fastener with a retention slot having an entrance portion, a stop surface and male fastener gripping means intermediate the entrance portion and the stop portion for securing a male fastener when in an interlocked relationship therein; the fastener system further includes a male fastener having an extension thereon for insertion into the entrance portion and including means thereon for piloting movement of the extension laterally within the retention slot into engagement with the stop portion; and wherein the male fastener includes a first surface thereon engageable with the gripping means for securing the male fastener against the stop portion and the male fastener includes a second surface for capturing a trim component and holding it interlocked engagement with respect to the vehicle panel.

Yet another object of the present invention is to provide an improved armrest assembly for use in motor vehicles having a rest surface and an integral insert with male fastener integrally formed thereon; a vehicle panel for supporting the armrest having slot means therein including an entrance portion, a stop portion, and fastener gripping means intermediate the stop portion and the entrance portion; the male fastener on the trim component integrally formed therewith including an extension insertable through the entrance portion without being interlocked thereto and the extension having piloting means thereon for laterally guiding the male fastener within the slot into engagement with the stop portion for referencing the trim part on the panel; and the male fastener including first and second surfaces thereon respectively engageable with the gripping means and with the outer surface of the trim component for interlocking it to the vehicle panel.

Still another object of the present invention is to provide an improved fastener system for connecting a vehicle trim component to a vehicle panel wherein the vehicle panel includes slots and the vehicle trim component includes integrally formed male fasteners thereon which can be formed by plastic molding processes requiring no lifters or slides and wherein the slots include an entrance portion for receiving the head of the male fasteners and an offset stop position and intermediate gripping segment that is operative to hold the male fastener in engagement with the stop position to reference the trim component with respect to the body portion.

Still another object of the present invention is to provide a fastening system of the type set forth in the preceding object wherein the trim component includes surface means thereon in overlying relationship with a rough edge of the vehicle panel to cover the rough edge when the trim component has been inserted and laterally interlocked with respect to the vehicle panel.

Yet another object of the present invention is to provide a two part attachment system that is simple and effective for connecting a vehicle trim part to a vehicle panel component in locked relationship without any movement of the trim component in any direction with respect to its supporting panel.

A further object is to provide a system of the type set forth in the preceding object which is capable of attaching armrests to door panels, door panels to door sheet metal, and carpet assemblies to doors or instrument panel lower panel portions without use of standard fastener components.

Other advantages and a more complete understanding of the invention will be more apparent from the succeeding detailed description of the invention and the accompanying drawings thereof.

DETAILED DESCRIPTION OF THE INVENTION

Figure 1:
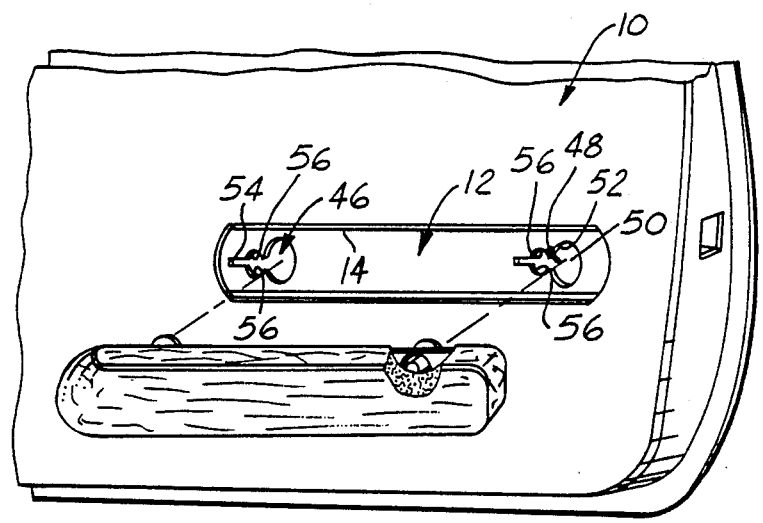
FIG. 1 is a perspective view of an armrest and door panel with the fastening system of the present invention shown in an exploded relationship.
Figure 2:
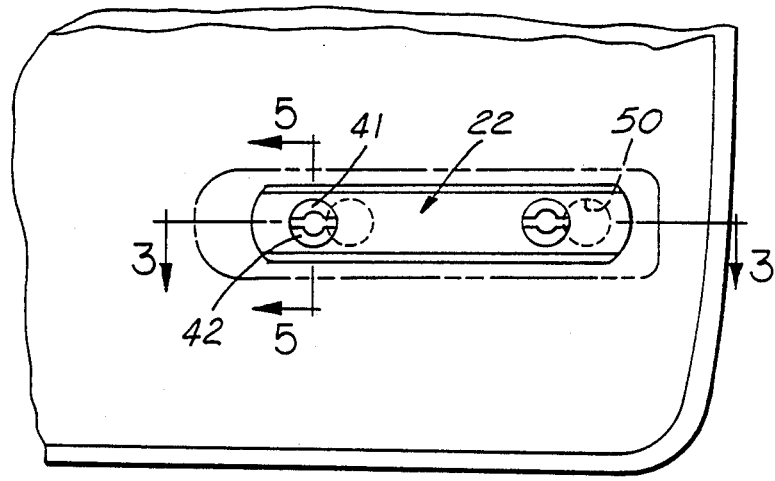
FIG. 2 is a front elevational view of a panel component of the fastening system connected to an insert of the present invention and with the armrest broken away.

Referring now to FIG. 1, a vehicle door panel assembly 10 has a female fastener component, representatively shown as a plate 12, secured to the inner surface of the door panel assembly 10 to form a raw edge 14 on the vehicle door panel assembly 10. The plate 12 and rough edge 14 are adapted to be covered by an interior trim component which is representatively shown as an armrest 16.

The armrest 16 includes an outer skin 18 such as polyvinyl chloride backed by a layer of resilient urethane foam 20. The armrest 16 further includes an insert 22 therein which is formed in accordance with the present invention to have a pair of spaced male fasteners 24, 26 integrally formed on the insert 22 in accordance with certain principles of the present invention.

Figure 6:
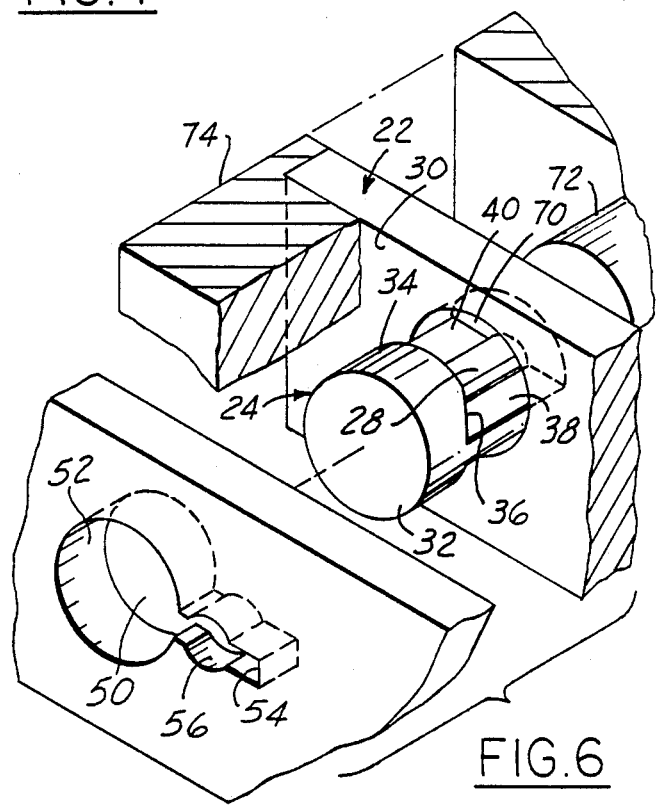
FIG. 6 is an enlarged perspective view of the male and female fasteners of the fastener system of the present invention with die components for making the male fastener shown in broken outline.

Referring more specifically to FIG. 6, the male fasteners 24, 26 are each configured to be formed from simple, straight draw mold dies that do not require the use of lifters or slides to form the male fastener surface configurations. More particularly, each of the male fasteners 24, 26 includes a central stem portion 28 that extends from the inboard surface 30 of the insert 22.

Figure 3:
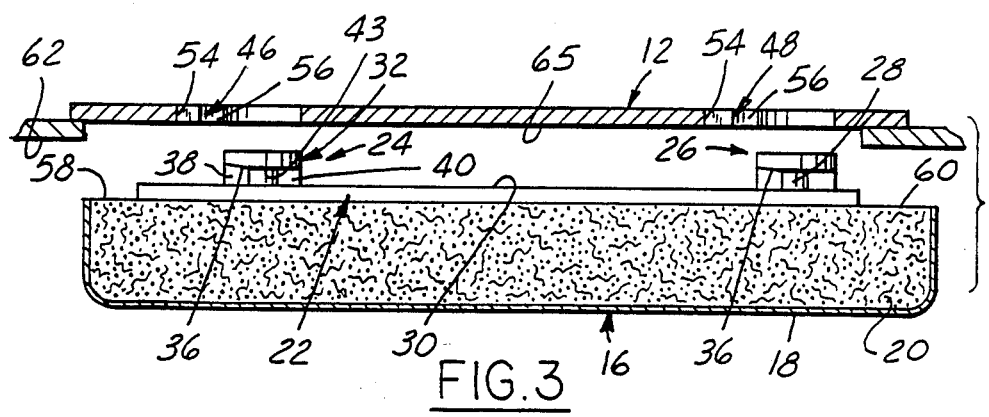
FIG. 3 is an enlarged sectional view taken along the line 3—3 of FIG. 2 looking in the direction of the arrows and showing an armrest in a preassembled position with respect to a door panel component including the fastener system of the present invention.

The central stem portion 28 is connected to a fastener head or cap 32 which has a circular peripheral surface 34 thereon. The head or cap 32 includes a ramp surface 36. A pair of spaced ribs 38, 40 are located on opposite sides of the central stem portion 28 as best seen in FIG. 3. They bridge tool openings 41, 42 in the insert 22 to connect the stem 28 to the insert 22.

Figure 4:
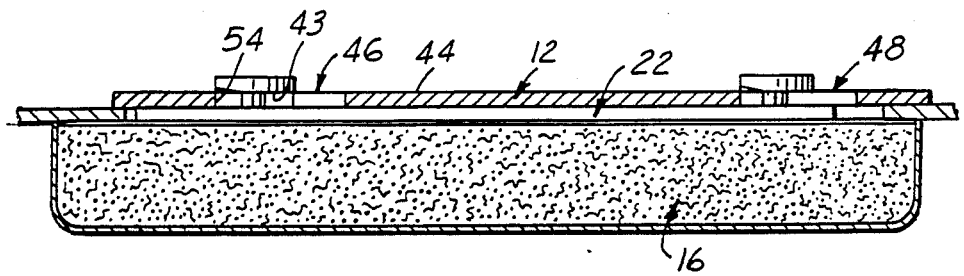
FIG. 4 is a view like FIG. 3 showing an armrest in interlocked relationship with the door panel component.
Figure 5:
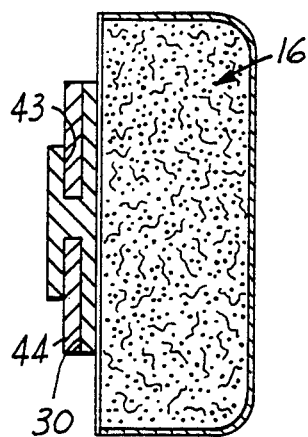
FIG. 5 is an enlarged vertical sectional view taken along the line 5—5 of FIG. 2 looking in the direction of the arrows.

The head or cap 32 further includes an inboard surface 43 thereon that is adapted to interlockingly engage the inner surface 44 of the plate 12 as shown in FIG. 4.

The fastener slots 46, 48 are spaced to receive heads 32 of the male fasteners 24, 26. Each of the fastener slots 46, 48 include an entrance portion 50 that has a peripheral wall 52 thereon that is of circular shape sized slightly greater than the outer circular peripheral surface 34 on each of the male fasteners 24, 26 for ease of insertion into the plate 12.

In accordance with the features of the present invention, slots 46, 48 further include a stop portion 54 therein which is located on one side of the entrance portion 50. The slots 46, 48 further include gripping surfaces 56 therein which are intermediate the entrance portion 50 and the stop portion 54.

The gripping surfaces 56 are a slightly lesser diameter than the stems 28 and thereby grip the male fasteners 24, 26 when they are shifted to the lock position shown in FIG. 4.

The ramp surfaces 36 pilot the male fasteners with respect to the plate 12 and will cause edge portions 58, 60 on the trim component to be held on side surfaces 62, 64 of the door panel assembly 10 so as to cover the raw edge 14.

Once the fasteners 24, 26 are ramped and shifted laterally with respect to the plate 12, the inboard surface 30 of the insert 22 will be located in juxtaposed relationship with the outer surface 65 of the plate 12. The ribs 38 will be engaged with the stop surface 54 to reference the armrest on the door panel to assure that the raw edge is covered. Engagement of stop surface 54 and rib 38 also assures that the central stem portions 28 are snapped into and gripped by the gripping surfaces 56 of the fastener slots 46, 48. Accordingly, the two bodies represented by the door panel assembly 10 and the armrest 16 are locked together without movement in the lateral direction or in the vertical direction.

The armrest 16 is also secured against outward pull from the door panel assembly 10 by engagement of inboard surface 43 on each of the male fasteners 24, 26 and the surface 44 of the plate 12.

The engagement between surfaces 43 and surface 44 causes the plate 12 to be captured between the head or cap 32 of each of the male fasteners 24, 26 and the inboard surface 30 of the insert 22 to securely hold the armrest against pull apart separation from the door panel assembly 10.

In accordance with certain other principles of the present invention, the male fasteners 24, 26 have outboard openings 41, 43 formed therein which enables the male fasteners 24 to be formed by a simple straight pull mold configuration having a die member 72 located in the holes 41, 43 to form ribs 38, 40, stem 28 and ramp 34. A second die member 74 is configured to form head 32. Die members 72, 74 are shown in broken outline in FIG. 6.

Likewise, the retention slots 46, 48 can be readily formed by injection molding techniques which can be formed in a straight line of draw and which require no lifters or slides (as in the case of the male fasteners 24, 26).

The plate 12 can be formed readily from plastic, steel or hardboard.

INDUSTRIAL APPLICABILITY

While the present invention has been discussed with respect to a vehicle trim part in the form of an armrest connected to a door panel, it is equally applicable to carpet assemblies having integral male fastener(s) of the aforedescribed type which can be fastened to a retention slot(s) on a door panel component; or the invention is applicable to a door panel having integral male fastener(s) formed thereon which will interlockingly connect to retention slot(s) in an inner sheet metal frame member portion of a vehicle. Finally, other components can have integral male fasteners of the aforedescribed type formed thereon to connect a first component to a second components.

The system enables first and second body portions including trim parts and vehicle body segments to be interlocked and joined by simply inserting and shifting parts relative to one another and to accomplish such interconnection by a system which will prevent movement of the fastened part in any direction once it is interlocked in place.

While representative embodiments of the present invention have been shown and described, those skilled in the art recognize that various changes and modifications may be made within the scope and equivalency range of the present invention as set forth in the following claims.

What is claimed is:

1. A fastener system for connecting interior trim products to a vehicle body part comprising:
    a female fastener member having a retention slot therein including a circular hole at one end of the slot and an opposite end segment in said retention slot;
    a trim member;
    fastener means on said trim member including a cylindrical tab having a outer peripheral surface thereon of circular form and including a smaller diameter center stem;

a pilot segment on one side of said tab and a trailing segment on the opposite side thereof, said tab having an insertion position with respect to said female fastener member and having an interlocked position with respect thereto;

a cap on said cylindrical tab having a diameter substantially the same as that of said outer peripheral surface and including spaced inboard locking surfaces thereon;

gripping means in said retention slot intermediate said circular hole and said opposite end segment engageable with said center stem when said cylindrical tab is directed through said circular hole and shifted laterally with respect thereto for securing said cylindrical tab in its laterally shifted position; and said locking surfaces and said female fastener member interlockingly securing said trim member to the vehicle body part against separation by pulling of said trim member in any direction with respect to the vehicle body part.

2. In the fastener system of claim 1,
said stem being circular cross-sectioned, said gripping means having wall means thereon in surrounding engagement with said center stem;
said opposite end segment having a rectangular cross-section engageable with said trailing segment for defining a stop position which assures interlocking engagement between said stem and said wall means when said cylindrical tab is inserted into and laterally shifted with respect to said female fastener member.

3. In the fastener system of claim 2, said pilot segment including a ramp surface which has a lead depth greater than the height of said stem for piloting lateral movement of said cylindrical tab from its inserted position in said circular hole to the interlocked position thereof with respect to said vehicle body part.

4. In the fastener system of claim 1, said pilot segment including a ramp surface which has a lead depth greater than the height of said stem for piloting lateral movement of said cylindrical tab from its inserted position in said circular hole to the interlocked position thereof with respect to said female fastener member.

5. A fastening system comprising a trim member and a body member;
said trim member having a male fastener integrally formed therewith for interlocking said trim member to said body member;
said body member having a female fastener with a slot for receiving said male fastener;
said slot including an entrance portion, a stop portion and a gripping means therein intermediate said stop portion and said entrance portion;
said male fastener having an extension thereon for insertion into said entrance portion;
said extension having means thereon for piloting said extension laterally of said slot into engagement with said stop portion;
first surface means on said extension engageable with said gripping means for holding said male fastener means against said stop portion to prevent movement of said trim member laterally of said body member;
second surface means on said extension for capturing said female fastener for interlocking said trim member with respect to said body member when said fastener is piloted laterally of said slot so as to prevent fore and aft separation of the trim member and the body member;

said male fastener extension including a cylindrical tab having an outer peripheral surface thereon of circular form and including a center stem with a pilot segment on one side thereof and a trailing segment on the opposite side thereof and having an interlocked position with respect to said female fastener;

a cap on said cylindrical tab having a diameter substantially the same as that of said outer peripheral surface and including spaced inboard locking surfaces thereon;

said gripping means engageable with said center stem when said cylindrical tab is directed through said entrance portion and shifted laterally with respect thereto for securing said cylindrical tab in its laterally shifted position.

6. A fastening system comprising a trim member and a body member;
said trim member having a male fastener integrally formed therewith for interlocking said trim member to said body member;
said body member having a female fastener with a slot for receiving said male fastener;
said slot including an entrance portion, a stop portion and a gripping means therein intermediate said stop portion and said entrance portion;
said male fastener having an extension thereon for insertion into said entrance portion;
said extension having means thereon for piloting said extension laterally of said slot into engagement with said stop portion;
first surface means on said extension engageable with said gripping means for holding said male fastener means against said stop portion to prevent movement of said trim member laterally of said body member;
second surface means on said extension for capturing said female fastener for interlocking said trim member with respect to said body member when said fastener is piloted laterally of said slot so as to prevent fore and aft separation of the trim member and the body member;
said male fastener extension including a cylindrical tab having an outer peripheral surface thereon of circular form and including a center stem with a pilot segment on one side thereof and a trailing segment on the opposite side thereof and having an interlocked position with respect to said female fastener;
a cap on said cylindrical tab having a diameter substantially the same as that of said outer peripheral surface and including spaced inboard locking surfaces thereon;
said gripping means engageable with said center stem when said cylindrical tab is directed through said entrance portion and shifted laterally with respect thereto for securing said cylindrical tab in its laterally shifted position;
said center stem being circular cross-section, said gripping means having wall means thereon in surrounding engagement with said center stem when said male fastener is interlocked to said female fastener;
said stop portion having a rectangular cross-section engageable with said trailing segment for defining a stop position which assures interlocking engagement between said center stem and said wall means when said cylindrical tab is inserted into and laterally shifted with respect to said body member;

7. A fastening system comprising a trim member and a body member;

said trim member having a male fastener integrally formed therewith for interlocking said trim member to said body member;

said body member having a female fastener with a slot for receiving said male fastener;

said slot including an entrance portion, a stop portion and a gripping means therein intermediate said stop portion and said entrance portion;

said male fastener having an extension thereon for insertion into said entrance portion;

said extension having means thereon for piloting said extension laterally of said slot into engagement with said stop portion;

first surface means on said extension engageable with said gripping means for holding said male fastener means against said stop portion to prevent movement of said trim member laterally of said body member;

second surface means on said extension for capturing said female fastener for interlocking said trim member with respect to said body member when said fastener is piloted laterally of said slot so as to prevent fore and aft separation of the trim member and the body member;

said male fastener extension including a cylindrical tab having an outer peripheral surface thereon of circular form and including a center stem with a pilot segment on one side thereof and a trailing segment on the opposite side thereof and having an interlocked position with respect to said female fastener;

a cap on said cylindrical tab having a diameter substantially the same as that of said outer peripheral surface and including spaced inboard locking surfaces thereon;

said gripping means engageable with said center stem when said cylindrical tab is directed through said entrance portion and shifted laterally with respect thereto for securing said cylindrical tab in its laterally shifted position;

said cylindrical tab including a ramp surface which has a lead depth greater than the height of said stem for piloting lateral movement of said cylindrical tab from its inserted position in said entrance portion to the interlocking position thereof with respect to said female fastener.

* * * * *